(12) United States Patent
Choo (10) Patent No.: US 10,256,487 B2
(45) Date of Patent: Apr. 9, 2019

(54) METHOD OF ACCELERATING FUEL CELL ACTIVATION

(71) Applicant: HYUNDAI MOTOR COMPANY, Seoul (KR)

(72) Inventor: Hyun Suk Choo, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 35 days.

(21) Appl. No.: 15/341,064

(22) Filed: Nov. 2, 2016

(65) Prior Publication Data
US 2017/0271693 A1  Sep. 21, 2017

(30) Foreign Application Priority Data
Mar. 16, 2016  (KR) .......................... 10-2016-0031289

(51) Int. Cl.
| H01M 8/04 | (2016.01) |
|---|---|
| H01M 8/04228 | (2016.01) |
| H01M 8/04746 | (2016.01) |
| H01M 8/04955 | (2016.01) |
| H01M 8/04828 | (2016.01) |
| H01M 8/04858 | (2016.01) |

(52) U.S. Cl.
CPC ..... *H01M 8/04228* (2016.02); *H01M 8/0491* (2013.01); *H01M 8/04753* (2013.01); *H01M 8/04955* (2013.01); *H01M 2250/20* (2013.01); *Y02T 90/32* (2013.01)

(58) Field of Classification Search
CPC .. H01M 8/04; H01M 8/0491; H01M 8/04228; H01M 8/04746; H01M 8/04753; H01M 8/04955; H01M 8/04828
See application file for complete search history.

(56) References Cited

U.S. PATENT DOCUMENTS

| 7,906,243 | B2 | 3/2011 | Lee et al. | |
|---|---|---|---|---|
| 2006/0166052 | A1 | 7/2006 | Lee et al. | |
| 2009/0123790 | A1* | 5/2009 | Chuah | C01B 3/0005 429/410 |
| 2011/0008686 | A1* | 1/2011 | Gould | H01M 8/04544 429/400 |
| 2013/0171529 | A1* | 7/2013 | Kato | H01M 8/04873 429/409 |

FOREIGN PATENT DOCUMENTS

| JP | 2003-163009 A | 6/2003 |
|---|---|---|
| JP | 2013-038032 A | 2/2013 |
| JP | 5545378 B2 | 7/2014 |
| KR | 10-2006-0085303 A | 7/2006 |
| KR | 10-2013-0010414 A | 1/2013 |
| KR | 10-2015-0043181 A | 4/2015 |

OTHER PUBLICATIONS

Korean Patent Application No. 10-2015-0067893 filed May 15, 2015. (w/ English abstract).

* cited by examiner

*Primary Examiner* — Karie O'Neill Apicella
(74) *Attorney, Agent, or Firm* — Morgan Lewis & Bockius LLP (57) ABSTRACT

A method of accelerating activation of a fuel cell stack includes repeating, a plurality of times, a process including: applying a specific cyclic voltammetric pulse of high current to the fuel cell stack for a designated time and maintaining shutdown of the fuel cell stack.

8 Claims, 6 Drawing Sheets

FIG. 1

- Prior Art -

METHOD OF ACCELERATING FUEL CELL ACTIVATION

CROSS-REFERENCE TO RELATED APPLICATION

This application claims under 35 U.S.C. § 119(a) the benefit of priority to Korean Patent Application No. 10-2016-0031289, filed on Mar. 16, 2016 with the Korean Intellectual Property Office, the entire contents of which are incorporated herein by reference.

TECHNICAL FIELD

The present disclosure relates to a method of accelerating fuel activation. More particularly, the present disclosure relates to a method of accelerating activation of a fuel cell using cyclic voltammetry which may shorten an activation time of a fuel cell stack and simultaneously reduce an amount of consumed hydrogen.

BACKGROUND

A fuel cell system may include a fuel supply system to supply fuel (hydrogen) to a fuel cell stack, an air supply system to supply oxygen in the air, serving as an oxidizer necessary for an electrochemical reaction, to the fuel cell stack, a thermal and water management system to control the operating temperature of the fuel cell stack, and the fuel cell stack to generate electric energy through the electrochemical reaction using hydrogen and air.

The fuel cell stack is manufactured with a structure in which several tens to hundreds of unit cells are stacked, and the unit cell includes a polymer electrolyte membrane which may move protons, a cathode and an anode which are catalyst layers applied to both surfaces of the electrolyte membrane so that hydrogen and oxygen may react with the cathode and the anode, gas diffusion layers stacked on the outer surfaces of the cathode and the anode, and bipolar plates stacked on the outer surfaces of the gas diffusion layers to supply the fuel and to discharge water through channels.

After assembly and manufacture of the fuel cell stack having such a configuration, activity of the fuel cell stack in electrochemical reactions is lower at an initial stage of operation and, thus, in order to maximally secure normal initial performance, an activation process of the fuel cell stack should be necessarily carried Out.

Such an activation process is also referred to as pre-conditioning or break-in, and the main object of the activation process is to activate catalytic layers, i.e., the electrode layers of the fuel cell stack, which do not take part in the reaction, and to sufficiently hydrate the electrolyte membrane so as to secure a proton path.

Further, through the activation process, the ElectroChemical Surface Area (ECSA) of a Pt supported on Carbon (Pt/C) electrode including the anode and the cathode of the fuel cell stack may be extended, and ionic conductivity within the electrolyte membrane in the fuel cell stack, for example, a perflurosulfonic acid membrane (PFSA), may be increased. As a result, initial output of the fuel cell stack to generate electricity may be raised.

Further, based on the activation process, by-products produced by thermal decomposition of Nafion added during manufacture of the electrode of the fuel cell stack is discharged through high humidity operation and, thus, a decrease in performance of the fuel cell stack due to mass transfer resistance may be minimized.

Various methods of activating fuel cells have been proposed but, in order to mass-produce fuel cell stacks mounted in fuel cell vehicles, measures to shorten a time taken for activation and to reduce an amount of consumed hydrogen are desirable.

For this purpose, the applicant of the disclosure already filed a method of accelerating activation of a fuel cell stack in which a process of applying high current to the fuel cell stack for a designated time and a process of maintaining shutdown by pumping hydrogen onto a reaction surface of a cathode for a designated time are repeated several times or more so as to shorten an activation time and simultaneously to reduce an amount of hydrogen consumed for activation [Korean Patent Application No. 10-2015-0067893 (filed on May 15, 2015)].

However, in order to mass-produce fuel cell stacks, an activation method which may further shorten an activation time and further reduce an amount of hydrogen consumed for activation is desirable.

SUMMARY

The present disclosure has been made in an effort to solve the above-described problems associated with the prior art and it is an object of the present disclosure to provide a method of accelerating activation of a fuel cell which may greatly shorten a time taken for activation and reduce an amount of consumed hydrogen by more rapidly increasing an activation speed of a fuel cell stack, as compared to a conventional method, using cyclic voltammetry in which a specific potential section is repeatedly applied to a high current section to which a designated current is applied.

In one embodiment of the present disclosure, a method of accelerating activation of a fuel cell stack is provided. The method includes repeating, a plurality of times, a process including: applying a specific cyclic voltammetric pulse of high current to the fuel cell stack for a designated time and; maintaining shutdown of the fuel cell stack.

A unit profile including the process of applying the specific cyclic voltammetric pulse to the fuel cell stack and maintaining shutdown of the fuel cell stack may be repeated from 10 to 20 times.

When the cyclic voltammetric pulse is applied, an upper limit voltage may be controlled to be less than 0.75V and a lower limit voltage may be controlled to be 0.55 V or more.

When the cyclic voltammetric pulse is applied, current may be repetitively applied within a section of 0.55 V to 0.6 V.

When the cyclic voltammetric pulse is applied, a maintenance time of a lower limit voltage may be more elongated than an upper limit voltage.

When the cyclic voltammetric pulse is applied, a sweeping speed of the voltammetric pulse at an anodic side may be slower than a sweeping speed of the voltammetric pulse at a cathodic side.

A frequency of the cyclic voltammetric pulse may be differentiated according to an activation level (%).

As the activation level (%) is decreased, the frequency of the cyclic voltammetric pulse may be decreased.

As the activation level (%) is increased, the frequency of the cyclic voltammetric pulse may be increased.

The step of maintaining shutdown of the fuel cell stack may be carried out by pumping hydrogen to a reaction surface of a cathode of the fuel cell stack for a designated time.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers may refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims.

Figure 1:
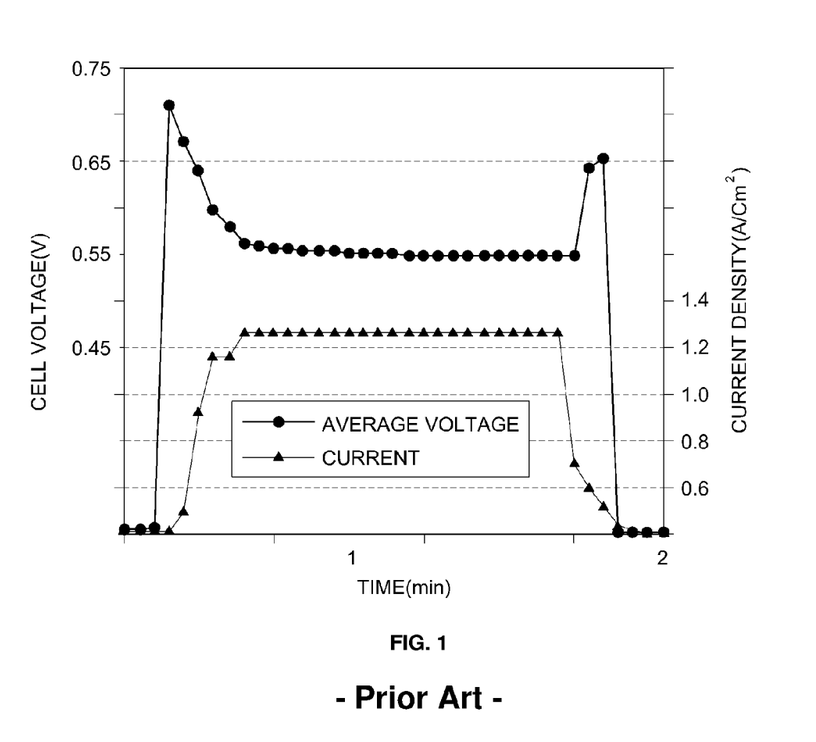
FIG. 1 is a graph representing a unit profile of current and average voltage in a conventional activation method of a fuel cell stack.
Figure 3:
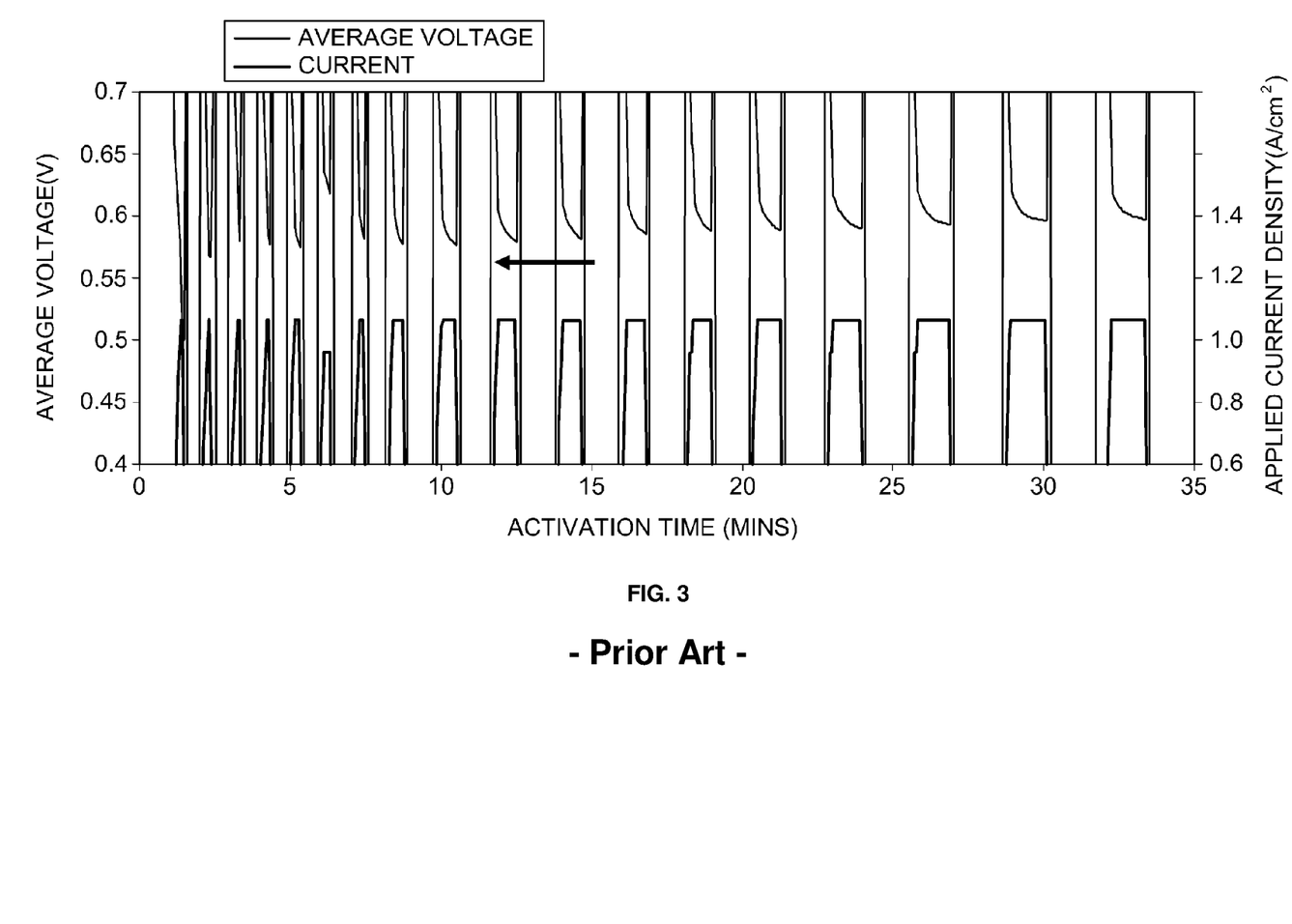
FIG. 3 is a graph representing the entire profile of current and average voltage in the conventional activation method of a fuel cell stack.

FIGS. 1 and 3 are graphs representing a conventional activation method of a fuel cell stack.

As exemplarily shown in FIGS. 1 and 3, the conventional activation method of the fuel cell stack is executed by repeating a process of applying high current to the fuel cell stack for a designated time and a process of maintaining shutdown of the fuel cell stack by pumping hydrogen onto a reaction surface of a cathode for a designated time several times or more.

In the conventional activation method, as illustrated in the unit profile shown in FIG. 1, high current of the same level is applied and simultaneously a vacuum activation process for stack shutdown is optimized. Thus, an activation time is about 35 minutes and an amount of hydrogen consumed for activation is about 0.6 kg, as illustrated in the entire profile shown in FIG. 3.

However, considering that, in order to mass-produce fuel cell stacks mounted in fuel cell vehicles, an activation time should be shortened as much as possible and simultaneously an amount of consumed hydrogen should be reduced as much as possible, the conventional activation method may not satisfy requirements to mass-produce fuel cell stacks.

Therefore, the present disclosure provides a method of accelerating activation of a fuel cell stack which may shorten an activation time of the fuel cell stack and simultaneously reduce an amount of consumed hydrogen by applying cyclic voltammetry to an activation process of the fuel cell stack.

Hereinafter, a method of accelerating activation of a fuel cell stack in accordance with the present disclosure will be described in detail.

Figure 2:
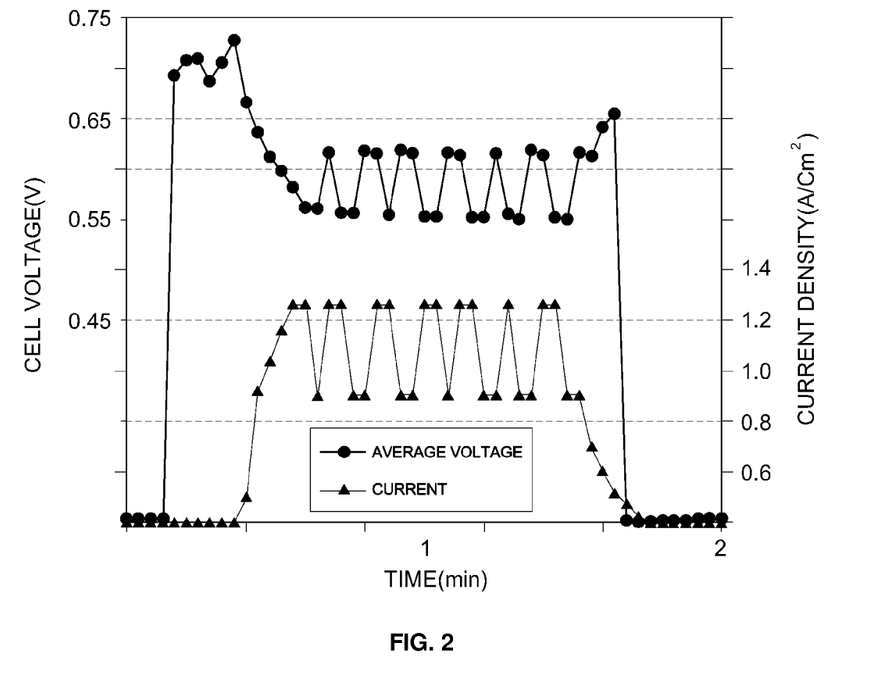
FIG. 2 is a graph representing a unit profile of current and average voltage in a method of accelerating activation of a fuel cell stack in accordance with embodiments of the present disclosure.
Figure 4:
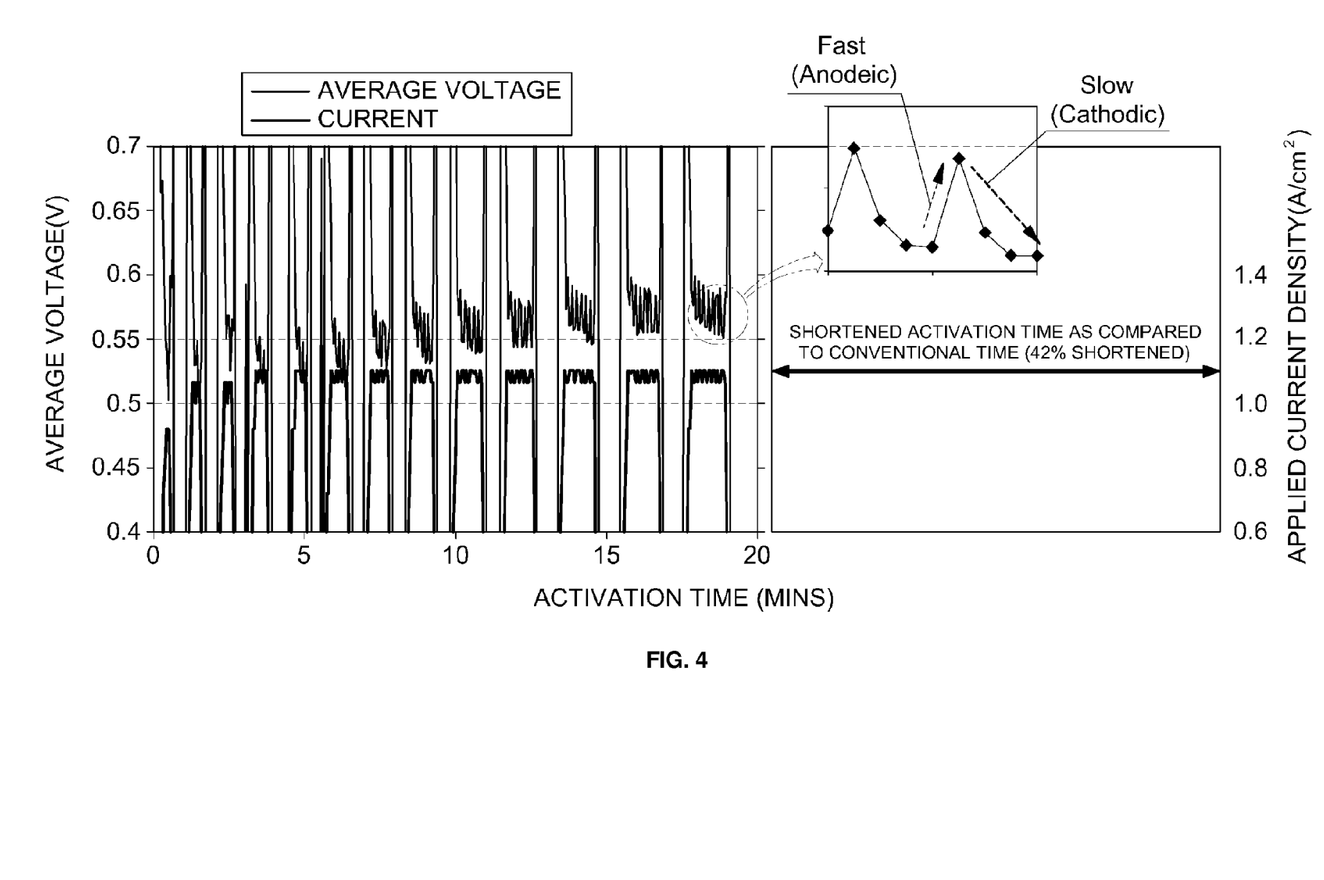
FIG. 4 is a graph representing the entire profile of current and average voltage in a method of accelerating activation of a fuel cell stack in accordance with embodiments of the present disclosure.

FIGS. 2 and 4 are graphs representing a method of accelerating activation of the fuel cell stack in accordance with embodiments of the present disclosure.

As exemplarily shown in FIGS. 2 and 4, the method of accelerating activation of the fuel cell stack in accordance with the present disclosure is executed by repeating a process of applying a specific cyclic voltammetric pulse of high current to the fuel cell stack for a designated time and a process of maintaining shutdown of the fuel cell stack by pumping hydrogen onto a reaction surface of a cathode of the fuel cell stack for a designated time several times or more.

Preferably, the method of accelerating activation of the fuel cell stack in accordance with the present disclosure is executed by repeating the unit profile of the activation process shown in FIGS. 2 10 to 20 times.

In more detail, the method of accelerating activation of the fuel cell stack in accordance with embodiments of the present disclosure is executed by repeating the unit profile including the process of applying the specific cyclic voltammetric pulse of high current to the fuel cell stack for the designated time and the process of maintaining shutdown of the fuel cell stack by pumping hydrogen onto the reaction surface of the cathode of the fuel cell stack for the designated time 10 to 20 times.

By applying the specific cyclic voltammetric pulse of high current to the fuel cell stack for the designated time in this manner, an activation time of the fuel cell stack may be shortened, as compared to the conventional method. The reason for this is that when voltage and current are continuously changed, water generated on the surface of a platinum catalyst of a cathode of a unit fuel cell during activation is uniformly redistributed, and a reduction of oxides existing inside platinum of the cathode (in particular, platinum edges) is facilitated due to repeated potential sweeps for reduction reaction. Thus, activity of the platinum catalyst of the cathode is increased.

Here, when the cyclic voltammetric pulse is applied, an upper limit voltage is controlled to less than 0.75V. The reason for this is to prevent initial degradation due to repeated voltammetric pulse operation during initial activation. In particular, if the upper limit voltage is 0.75V or more, oxygen permeates a platinum lattice of the cathode, oxidation of platinum (Pt . . . O) is carried out due to place exchange and, thus, stability of platinum is lowered.

Further, when the cyclic voltammetric pulse is applied, a lower limit voltage is controlled to 0.55V or more. The reason for this is to prevent initial degradation due to repeated voltammetric pulse operation during initial activation and, in particular, if the lower limit voltage is less than 0.55V, degradation of an electrolyte membrane or a catalyst binder is caused due to hydrogen peroxide ($H_2O_2$) generated by side reactions during the oxidation reduction reaction of air.

More preferably, when the cyclic voltammetric pulse is applied, the range between the lower limit voltage and the upper limit voltage may be controlled to 0.55V to 0.6V. The reason for this is that such a range has excellent activation accelerating effects, as will be understood from embodiments and test examples, which will be described below.

Further, when the cyclic voltammetric pulse is applied, a maintenance time of the lower limit voltage may be elongated, as compared to the upper limit voltage, as exemplarily shown in FIG. 4, and the reason for this is to increase a driving force for a reduction of oxides existing in platinum of the cathode.

Further, when the cyclic voltammetric pulse is applied, a sweeping speed of the voltammetric pulse at the anodic side is preferably slower, as compared to a sweeping speed of the voltammetric pulse at the cathodic side, as exemplarily shown in FIG. 4. The reason for this is to increase a driving force for a reduction of the oxides existing in platinum of the cathode.

Preferably, when the cyclic voltammetric pulse is applied, a frequency of cyclic voltammetric pulses in the unit profile is differentiated according to activation levels (%). That is, as the activation level (%) is decreased, the frequency of cyclic voltammetric pulses is decreased. The reason for this is that fast pulse potential sweeping caused by a decrease in the frequency of cyclic voltammetric pulses may effectively achieve activity recovery of a catalyst layer, such as removal of impurities from the surface of the catalyst layer or oxide reduction.

On the other hand, as the activation level (%) is increased, the frequency of cyclic voltammetric pulses is increased. The reason for this is that, when an application time of the voltammetric pulse of high current is increased due to slow pulse potential sweeping, an ion path is formed by a rearrangement of a sulfonic acid group and thus wetting of the electrolyte membrane and the binder is effectively carried out.

Further, in the process of maintaining shutdown of the fuel cell stack by pumping hydrogen to the reaction surface of the cathode of the fuel cell stack, pumping of hydrogen to the reaction surface of the cathode means that the shutdown maintenance process includes a process of supplying hydrogen to the anode simultaneously with a cut-off of oxygen supply to the cathode in the shutdown state of the stack, a reaction process of separating hydrogen into protons and electrons in the anode ($H_2 \rightarrow 2H^+ + 2e^-$), and a reaction process of generating hydrogen in the cathode by moving the separated protons to the cathode through the electrolyte membrane and simultaneously recombining the protons with electrons flowing to the cathode through an external line ($2H^+ + 2e^- \rightarrow H_2$).

Therefore, for a shutdown maintenance time for which hydrogen is pumped to the reaction surface of the cathode, by applying the cyclic voltammetric pulse to the reaction surface simultaneously with removal of oxygen, oxide removal from the surface of the platinum catalyst of the cathode is facilitated under the condition that a reduction atmosphere is formed by pumping hydrogen to the cathode.

Here, in order to rapidly remove remaining oxygen from the cathode, a process of applying the cyclic voltammetric pulse within a range, within which counter voltage is not applied, prior to shutdown, is necessary, and a cell potential is rapidly lowered to a voltage of 0V by such a process of applying the cyclic voltammetric pulse and thus the cathode is in an oxygen-free state.

When hydrogen is pumped to the cathode in the oxygen-free state of the cathode and thus the reduction atmosphere is formed and the cyclic voltammetric pulse is continuously applied to the stack, the reaction speed of oxide reduction of the platinum surface of the cathode may be raised by the reduction atmosphere of hydrogen and, as a result, activation of the catalyst of the cathode may be accelerated.

Particularly, when high current for an activation of the fuel cell stack is applied, a cyclic voltammetric pulse is continuously applied and, thus, a uniform redistribution of water generated in the catalyst layer of the cathode is carried out through high current pulse operation during activation, and an increase in activity of the platinum catalyst of the cathode is carried out by removal of . . . OH and . . . CO from platinum edge parts in a catalyst layer reduction section (a portion indicated by "Fast(Anodic in FIG. 4)", for example, a section in which voltage is lowered from 0.63V to 0.55V). Thus, an activation time of the fuel cell stack may be greatly reduced.

Hereinafter, methods of accelerating activation of a fuel cell stack in accordance with embodiments of the present disclosure will be described.

Embodiment 1

Figure 5:
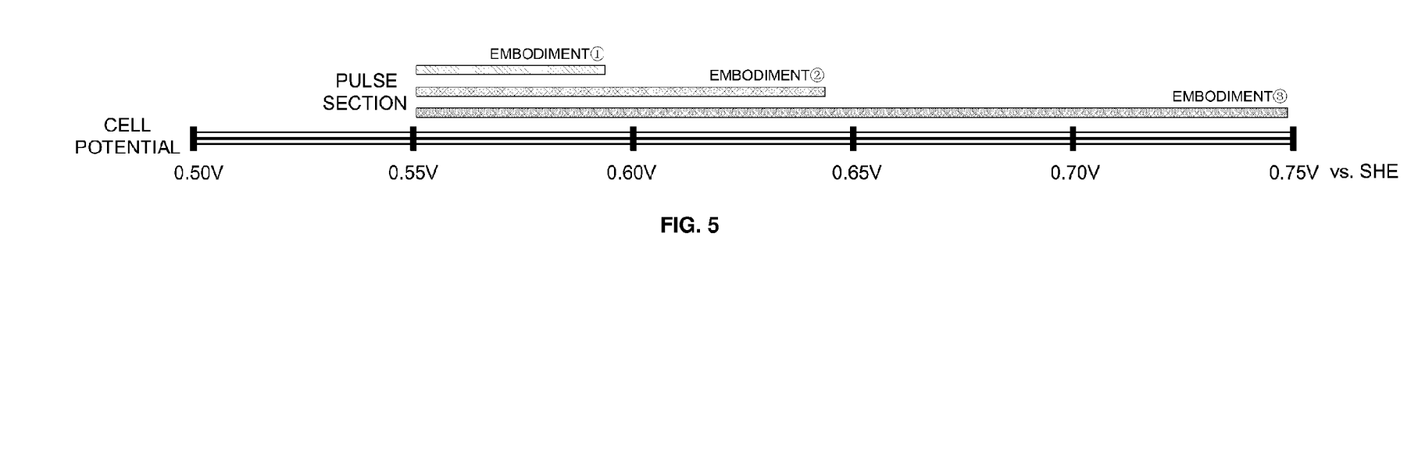
FIG. 5 is a graph representing performance evaluation of methods of accelerating activation of a fuel cell stack in accordance with embodiments of the present disclosure.

A fuel cell stack is operated by applying a cyclic voltammetric pulse thereto for a designated time (two and a half minutes: with reference to FIG. 2). Here, a unit profile including a sweeping process while applying a pulse set to be within a range between a lower limit voltage and an upper limit voltage of 0.55V to 0.58V (with reference to Embodiment 1 of FIG. 5) and a shutdown maintenance process of pumping hydrogen to a reaction surface of a cathode of the fuel cell stack is repeated several times (13 times in FIG. 3).

Embodiment 2

A fuel cell stack is operated by applying a cyclic voltammetric pulse thereto for a designated time (two and a half minutes: with reference to FIG. 2). Here, a unit profile including a process of sweeping a pulse set to be within a range between a lower limit voltage and an upper limit voltage of 0.55V to 0.63V (with reference to Embodiment 2 of FIG. 5) and a shutdown maintenance process of pumping hydrogen to a reaction surface of a cathode of the fuel cell stack is repeated several times (13 times in FIG. 3).

Embodiment 3

A fuel cell stack is operated by applying a cyclic voltammetric pulse thereto for a designated time (two and a half minutes: with reference to FIG. 3). Here, a unit profile including a process of sweeping a pulse set to be within a range between a lower limit voltage and an upper limit voltage of 0.55V to 0.75V (with reference to Embodiment 3 of FIG. 5) and a shutdown maintenance process of pumping hydrogen to a reaction surface of a cathode of the fuel cell stack is repeated several times (13 times in FIG. 3).

Test Examples

Figure 6:
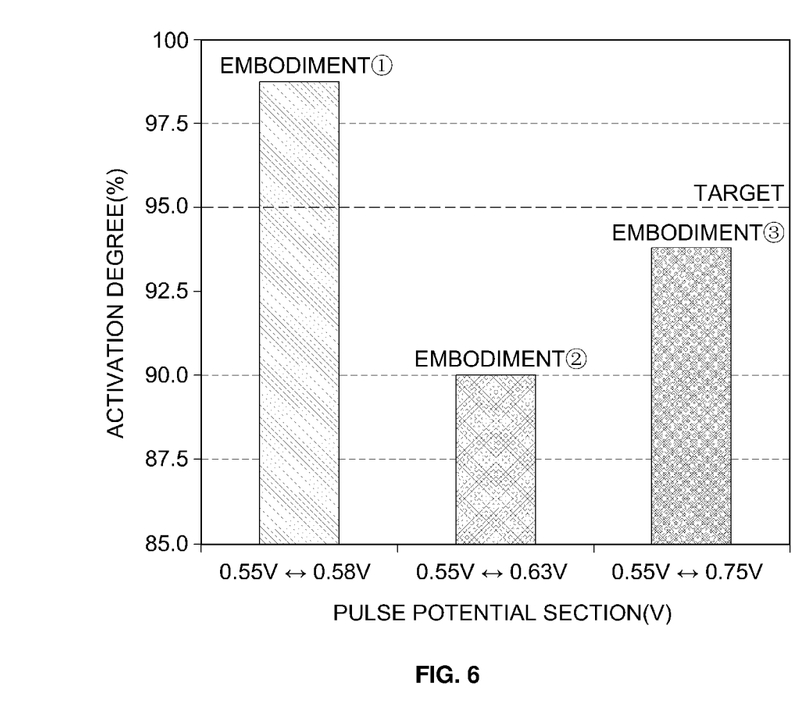
FIG. 6 is a graph illustrating a result of test examples of FIG. 5.

Activation processes in accordance with the above-described embodiments 1, 2 and 3 were carried out for 20 minutes and then activation degrees (%) were measured using general equipment. FIG. 6 illustrates the results of the measurement.

As exemplarily shown in FIG. 6, as a result of the activation processes in accordance with the embodiments 1, 2 and 3 carried out for 20 minutes, the embodiments 1, 2 and 3 resulted in activation degrees of 90% or more.

Particularly, it may be understood that, in the case of the embodiment 1 in which the range between the lower limit voltage and the upper limit voltage is set to 0.55V to 0.58V, the activation degree exceeds a target value (95%), and this results from an increase of reduction power of the catalyst, i.e., achievement of reduction up to oxides existing at platinum edge sites, when cyclic voltammetry is applied to a low voltage section of 0.6V or less.

As described above, by continuously applying a cyclic voltammetric pulse when high current for activation of a fuel cell stack is applied to the fuel cell stack, an activation speed of the fuel cell stack may be rapidly increased, as compared to a conventional method, and thus an activation time may be greatly shortened to about 20 minutes from the conventional activation time of about 35 minutes by about 42%. Further, as the activation time is greatly shortened, an amount of hydrogen consumed for the activation process may be greatly reduced to 0.4 kg, as compared to the conventional amount of hydrogen consumed of about 0.6 kg.

As is apparent from the above description, a method of accelerating activation of a fuel cell stack in accordance with the present disclosure provides several effects and benefits, as below.

First, the method in accordance with the present disclosure continuously provides a cyclic voltammetric pulse to a high current (same current) section and may thus more rapidly increase an activation speed of the fuel cell stack, as compared to a conventional method, and thus greatly shorten an activation time, as compared to the conventional method.

Second, the method in accordance with the present disclosure greatly shortens the activation time of the fuel cell stack and may thus significantly reduce an amount of hydrogen consumed during an activation process.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A method of accelerating activation of a fuel cell stack, the method comprising:
   repeating, a plurality of times, a process including steps of:
   applying a specific cyclic voltammetric pulse of high current to the fuel cell stack for a designated time; and
   maintaining shutdown of the fuel cell stack,
   wherein the step of maintaining shutdown of the fuel cell stack is carried out by pumping hydrogen to a reaction surface of a cathode of the fuel cell stack for a designated time, and
   wherein, in the step of applying a specific cyclic voltammetric pulse of high current to the fuel cell stack for a designated time, a sweeping speed of the voltammetric pulse at an anodic side is slower than a sweeping speed of the voltammetric pulse at a cathodic side.

2. The method of claim 1, wherein a unit profile including the process of applying the specific cyclic voltammetric pulse to the fuel cell stack and maintaining shutdown of the fuel cell stack is repeated from 10 to 20 times.

3. The method of claim 1, wherein, in the step of applying a specific cyclic voltammetric pulse of high current to the fuel cell stack for a designated time, an upper limit voltage is controlled to be less than 0.75V and a lower limit voltage is controlled to be 0.55 V or more.

4. The method of claim 1, wherein, in the step of applying a specific cyclic voltammetric pulse of high current to the fuel cell stack for a designated time, current is repetitively applied within a section of 0.55 V to 0.6 V.

5. The method of claim 1, wherein, in the step of applying a specific cyclic voltammetric pulse of high current to the fuel cell stack for a designated time, a maintenance time of a lower limit voltage is more elongated than an upper limit voltage.

6. The method of claim 5, wherein a frequency of the cyclic voltammetric pulse is differentiated according to an activation level (%).

7. The method of claim 6, wherein as the activation level (%) is decreased, the frequency of the cyclic voltammetric pulse is decreased.

8. The method of claim 6, wherein, as the activation level (%) is increased, the frequency of the cyclic voltammetric pulse is increased.

* * * * *